United States Patent [19]

Bottrell

[11] Patent Number: 4,710,841
[45] Date of Patent: Dec. 1, 1987

[54] SYSTEM FOR PRODUCTION OF INDUCTION MACHINES AGAINST DAMAGE FROM RESIDUAL VOLTAGE EFFECTS

[76] Inventor: Gerald W. Bottrell, 2442 Teasley St., La Crescenta, Calif. 91214

[21] Appl. No.: 790,151

[22] Filed: Oct. 23, 1985

[51] Int. Cl.4 .............................................. H02H 7/08
[52] U.S. Cl. ........................................ 361/23; 361/29; 361/33; 307/86; 307/142
[58] Field of Search ....................... 361/23, 29, 33, 92, 361/192; 307/64, 70, 85, 86, 142

[56] References Cited

U.S. PATENT DOCUMENTS

| | | | |
|---|---|---|---|
| 3,894,274 | 7/1975 | Rosenberry, Jr. ..................... | 361/23 |
| 4,022,598 | 5/1977 | Gucwa, Jr. et al. ................ | 361/29 X |
| 4,310,771 | 1/1982 | Wyatt et al. ........................... | 307/64 |
| 4,384,213 | 5/1983 | Bogel .................................. | 307/70 X |
| 4,451,865 | 5/1984 | Warner et al. ......................... | 361/23 |

Primary Examiner—A. D. Pellinen
Assistant Examiner—Derek S. Jennings
Attorney, Agent, or Firm—John J. Posta, Jr.

[57] ABSTRACT

Protection of induction motors and generators is provided to allow rapid reclosure of the power supply or fast transfer from one power supply to an alternate supply. A switching sequence is disclosed in which motor stator windings are short circuited immediately following interruption of the supply voltage. Said short circuit quickly discharges to a safe value the energy stored in the rotor of the induction machine, allowing the short circuit to be removed and safe reconnection to the power supply to be accomplished without further delay.

18 Claims, 12 Drawing Figures

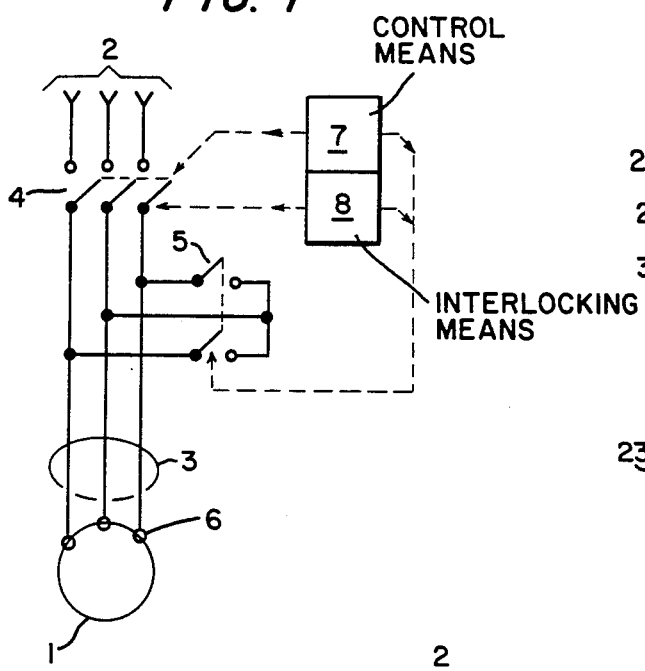
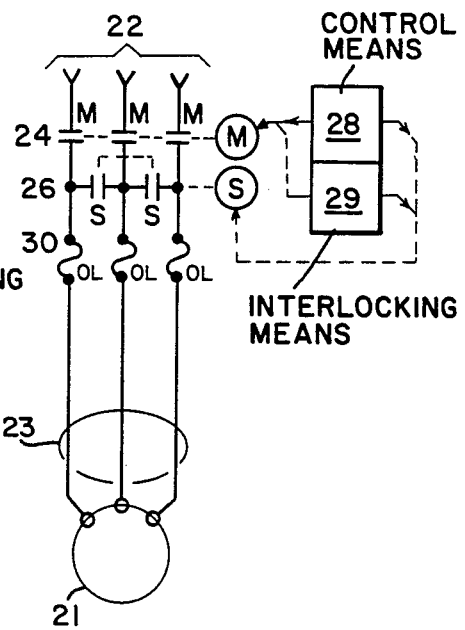
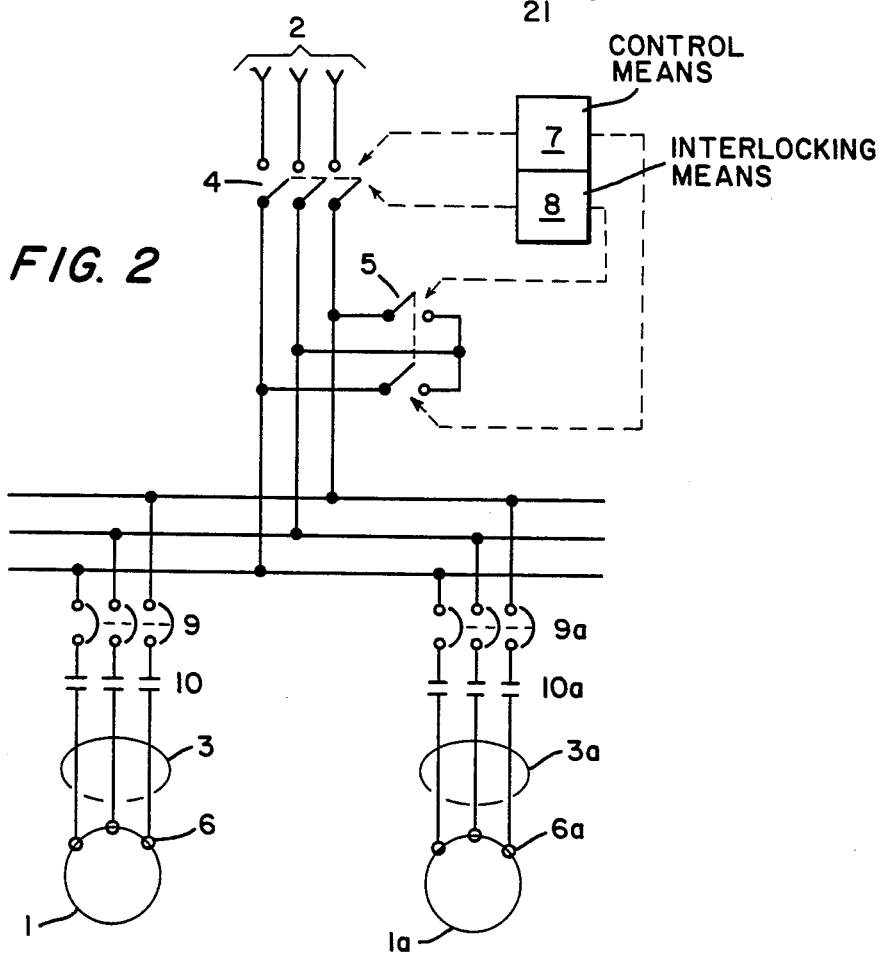

SYSTEM FOR PRODUCTION OF INDUCTION MACHINES AGAINST DAMAGE FROM RESIDUAL VOLTAGE EFFECTS

FIELD OF THE INVENTION

The present invention relates generally to control systems for induction motors, and more particularly to a system for protecting induction motors and generators by quickly discharging to a safe value energy stored in the rotor following interruption of the supply voltage, thereby enabling rapid reclosure of the power supply or fast transfer from one power supply to an alternate power supply.

When disconnected from the power supply, induction motors and generators produce at their terminals a residual voltage which decays with time. Initially, the residual voltage magnitude is nearly equal to that of the source voltage, but decays exponentially to approximately 37 percent of its initial value in a period of time equal to the machine open circuit time constant. This time constant varies from ½ second for the smaller machines to 3 or 4 seconds for the larger units.

If the power supply to an induction machine is interrupted and quickly re-established, the machine may be subjected to a voltage equal to its residual voltage plus that of the oncoming supply. If the resultant voltage is more than 125 to 130 percent of rated voltage, the machine may be damaged from the resultant high current and torque.

To avoid such problems, rapid reclosing of the utility source to industrial plants with large induction machines is seldom allowed. This is unfortunate, as the practice of rapid reclosing is very effective in quickly re-establishing voltage to the plant following a self-clearing short-circuit.

Another condition greatly affected by residual voltage is the practice of rapid switching from one source of supply to an alternate source after the first source fails. When induction machines approximately 50 horsepower and larger are involved, the following three switching techniques have been utilized to avoid machine damage:

1. Fast transfer, in which the switching takes place so fast that the residual voltage angle has not drifted too far out of phase from that of the supply voltage. This is commonly used in power stations in switching from the emergency source to the normal source without affecting plant operations. The fast transfer, while effective, can only be applied in special cases where the two sources are always in synchronism, the entire sequence must take place in approximately 0.1 second or less, and the induction machines and their driven equipment have a high and predictable inertia.

2. In-phase transfer, in which a phase angle relay is utilized to initiate transfer at the precise moment when the residual voltage is in phase or nearly in phase with the oncoming voltage. This too can be safely applied only when load inertias are very large and predictable, when the number and size of machines is constant and when switching times are fast and predictable.

3. Delayed transfer, in which the transfer is delayed for a predetermined period of time, or by a residual voltage relay, to allow transfer to take place only after residual voltage has decayed to a safe value, usually about 25 percent of machine rated voltage.

Delayed transfer is essentially risk free but so slow as to interrupt process operations. Also, in most cases, motor loads cannot be re-accelerated simultaneously following a slow transfer as motor speeds have fallen so low that inrush currents approach motor locked rotor values and stalling would occur due to depressed voltage. As a result, most delayed transfer schemes allow for re-accelerating only the few most critical drives or else motors are restarted in staggered blocks so that full plant operations may not be re-established for more than one minute.

SUMMARY OF THE INVENTION

The principal object of the present invention is to provide a system for protection of induction machines, of any size or inertia, which allows transfer from one power source to another power source in approximately ½ second or less, without subjecting the induction machines to unsafe voltage magnitudes at their stator winding terminals.

Another objective is to provide a system for protection of induction machines, of any size or inertia, which allows disconnecting the power source to induction machines and reclosing said power source within approximately ½ second or less without subjecting the induction machines to unsafe voltage magnitudes at their stator winding terminals.

In accordance with the present invention, these and related objectives are achieved by short circuiting the leads to the induction machines, after the source voltage has been interrupted. The short circuit is maintained until induction machine internal voltages have decayed to a safe value, at which time the short circuit is removed and the source voltage re-established without further delay. By applying the short circuit in that manner, the time for the residual voltage to decay to a safe value is reduced to 5 to 10 percent of the time required without the short circuit.

Such features will be apparent from a detailed consideration of the remainder of this specification and the accompanying drawings in which:

DESCRIPTION OF THE DRAWINGS

FIGS. 1 and 3 are schematic diagrams of power circuits for a single induction motor protected according to this invention;

FIG. 2 is the same as FIG. 1 except multiple motors are protected;

DETAILED DESCRIPTION OF THE PREFERRED EMBODIMENT

Figure 4:
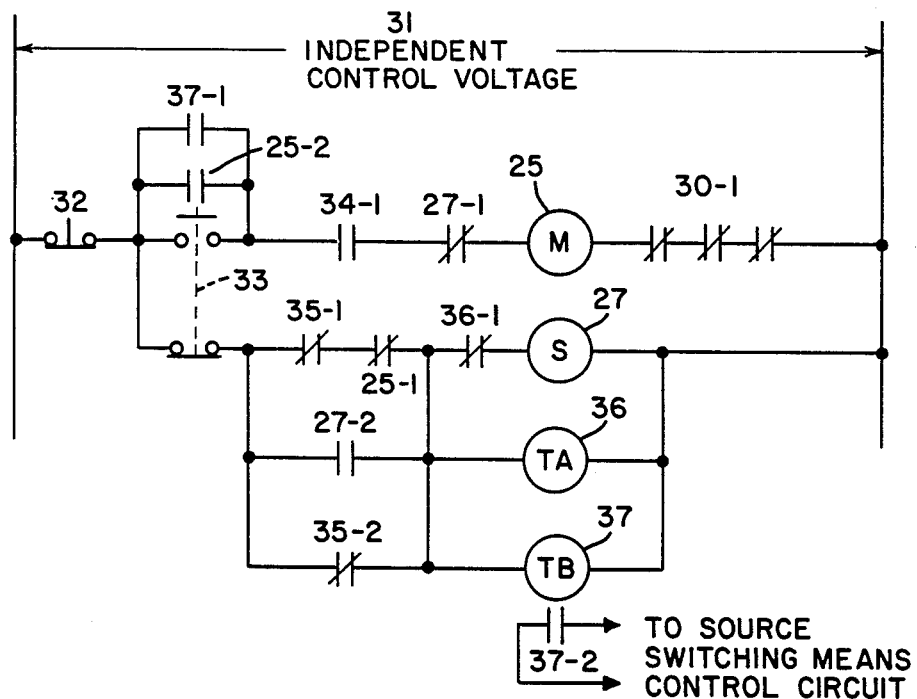
FIG. 4 is a control schematic diagram depicting one form of control and interlocking means for the system of FIG. 3.

FIG. 1 depicts an induction machine 1 connected to a voltage source 2 by means of supply conductors 3 and source switching means 4. A short-circuiting switch 5 is connected between said source switching means 4 and machine terminals 6 in such a manner that said supply conductors 3 are short circuited when said short-circuiting switch 5 is closed. A control means 7 is provided to close the short-circuiting switch 5 when the voltage source 2 is interrupted, to hold the short-circuiting switch 5 closed for a predetermined period of time and, at the end of said time period, to open the short-circuiting switch 5 thereby enabling the voltage source 2 to be re-established.

To avoid short circuiting the voltage source 2, most applications would utilize an interlocking means 8 to prevent closing the voltage source switching means 4 until the short-circuiting switch 5 is open and to prevent closing the short-circuiting switch 5 until the voltage source switching means 4 is open.

The system of FIG. 1 allows the source voltage to be safely re-established much faster than would be the case with no short-circuiting switch 5. If the short-circuiting switch 5 is held closed for a period of time slightly longer than the short-circuit time constant of the machine, the residual voltage will have decayed to a safe value. Since the short-circuit time constant is only 5 to 10 percent of the open-circuit time constant, the required time to maintain the short circuit is well under ½ second even for the largest machines.

Instead of holding the short-circuiting switch 5 closed for a period of time, it can also be held closed until the residual voltage decays to a safe value, as detected by an undervoltage relay (not shown).

While FIG. 1 depicts a single induction machine, it applies equally well to a plurality of such machines. Each such machine would normally have its own disconnecting means and overcurrent protection in its individual supply conductors. These individual disconnecting means and overcurrent protective devices must be of a type that stay connected to the line through interruption of the source voltage and short circuiting of the supply conductors, in order to allow the machine short-circuit current to flow. Such a multiple machine system is depicted in FIG. 2 in which a first machine 1 and a second machine 1a represent two or more induction machines connected to a source as in FIG. 1 except through individual circuit breakers 9 and contactors 10. Short circuit protection and disconnecting means is provided by said circuit breakers 9 which is a mechanically latched device and, as such, will stay closed and not trip through loss of source voltage and the machine short circuit. Machine on-off control and overload protection is provided by said contactors 10 which must be the mechanically latched type or have its operating coil energized from an independent voltage source. For those cases in which an electrically operated circuit breaker serves the functions of the circuit breaker and the contactor, said contactors 10 are not required and no special provisions would be required to hold the circuit breakers 9 closed through loss of source voltage.

The simplest and presently preferred form of the invention, for protection of a single motor, is illustrated in FIGS. 3 and 4. FIG. 3 depicts the power circuit for a 3 phase induction motor. Motor 21 is connected to a voltage source 22 by means of supply conductors 23 and a 3 pole motor starter (contactor) 24, having operating coil 25 and overload heater elements 30. Connected between the motor 21 and its starter 24, is a two pole short-circuiting contactor 26 with operating coil 27. The coils of both contactors 24, 26 are electrically controlled by a control means 28 and an interlocking means 29. This configuration protects the single motor 21 against damage from interruption and rapid reclosing of the source voltage and from rapid switching from one source voltage to another.

Electrical control means and electrical interlocking means for the system of FIG. 3 are shown schematically in FIG. 4. The main starter coil 25 and the short-circuiting contactor coil 27 are connected, through control devices, across an independent control voltage 31 which will be maintained through loss of the motor supply voltage and short circuiting of the motor supply conductors. In series with the motor starter coil 25 is a stop pushbutton 32, a start pushbutton 33, a normally closed auxiliary contact 27-1 of the short-circuiting contactor 27, contacts 30-1 of overload relays 30, a contact which opens when supply voltage is interrupted 34-1, and a normally open contact 25-2 of the motor starter 25 connected across the start pushbutton 33 to hold the starter coil 25 energized after the pushbutton 33 is momentarily depressed. Also in parallel with the start pushbutton is a contact 37-1 of a time delay relay coil 37, to be described below.

Connected in series with the short-circuiting contactor coil 27 is a normally closed contact 25-1 of the motor starter 25, a contact 35-1 which closes when supply voltage is lost, a normally closed contact 36-1 of a timing relay 36, and a contact of the start pushbutton 33 which opens when the pushbutton is depressed. Connected in parallel across the series connection of said normally closed contact 25-1 of the motor starter 25 and said contact 35-1 which closes when supply voltage is lost, is a normally open contact 27-2 of said short-circuiting contactor coil 27 and a second contact 35-2 which closes when supply voltage is lost. Connected across the short-circuiting contactor coil 27 are two time delay relay coils 36, 37. The contact 36-1 of the first relay 36 is time delayed opening after the coil 36 is energized, while contacts 37-1, 37-2 of the second relay 37 are time delayed opening after the coil 37 is de-energized.

Control means are provided by said contacts 34-1 35-1, 35-2 which assume the condition shown when the voltage source is interrupted, and by the two time delay relays 36, 37 with their contacts 36-1, 37-1, 37-2. Said first time delay relay contact 36-1 opens after short circuiting contactor coil 27 has been energized, for a predetermined period of time, to de-energize the coil 27 and open the short-circuiting contactor 26 (FIG. 3). Said second time delay relay contacts 37-1, 37-2 are closed when said short-circuiting contactor 26 is closed and remain closed for a predetermined period of time after the source voltage returns to normal and the short-circuiting contactor is opened. One said contact 37-1 operates to reclose the motor starter 24 (FIG. 3) when conditions are right, and the other contact 37-2 operates to reclose, or permit to be reclosed, a source switching means (not shown). Electrical interlocks are provided by the contact 27-1 of the short-circuiting contactor in series with the coil 25 of the main contactor, and the contact 25-1 of the main contactor in series with the coil 27 of the short-circuiting contactor. In addition to the stated electrical interlocks, a mechanical interlock may be provided so that only one of the two contactors can be closed at the same time.

Various detection means may be utilized to sense interruption of the source voltage and initiate a switching sequence, through said contacts 34-1, 35-1, 35-2 which assume the condition shown when the voltage source 22 is interrupted, as listed below:
1. Auxiliary contact on one or more source circuit breaker, to initiate transfer when said circuit breaker is tripped;
2. Undervoltage relay;
3. Underfrequency relay; or
4. Any combination of the above.

It will be understood by those skilled in the art, that a large variation in hardware and control means (logic) may be utilized within the scope of the present invention. The logic described in FIG. 4 covers only one set of conditions in which magnetically-held contactors and electromechanical relays are utilized. Some of the other possibilities are as follows:
1. Both switching devices may be electrically operated circuit breakers having trip coils and closing coils which must be energized to close and trip. Control voltage may be direct current or alternating current and should preferably be supplied from an independent source.
2. One switching means may be a circuit breaker and the other a contactor.
3. Relays may be solid state devices.
4. Contactors may be the mechanically latched type with ratchet type operation in which the contactor coil is energized once to close the contactor and energized a second time to open the contactor.

Figure 5:
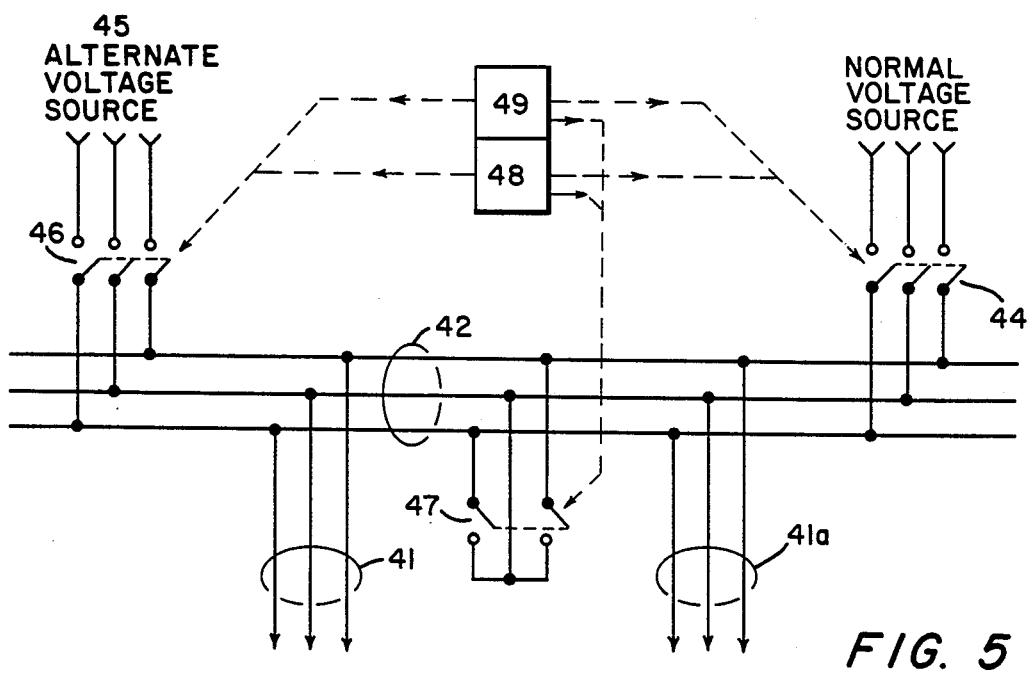
FIG. 5 shows an arrangement wherein multiple induction machines are protected while being supplied from two alternate voltage sources.

FIG. 5 illustrates a system for automatic transfer from a normal source to an alternate source. Outgoing feeder circuits 41, 41a represent one or more motor supply conductors or one or more feeders to remote groups of motors. These circuits are supplied from distribution bus bars 42 which, in turn, are supplied from a normal voltage source 43 through a normally closed switching means 44 and an alternate voltage source 45 through a normally open switching means 46. Also connected to said bus bars, is a two pole short-circuiting switch 47 arranged to short circuit said bus bars, and said outgoing circuits, when closed.

A control means 48 functions to open said normal source switching means 44, to close said short-circuiting switch 47 when the normal voltage source is interrupted, to hold said short-circuiting switch 22 closed for a predetermined period of time and, at the end of said time period, to open the short-circuiting switch 22 thereby enabling said alternate source switching means 46 to be closed.

An interlocking means 49 is provided to prevent closing said short-circuiting switch 47 unless both voltage source switching means are open and to prevent closing either voltage source switching means 44, 46 unless said short-circuiting switch 47 is open.

Figure 6:
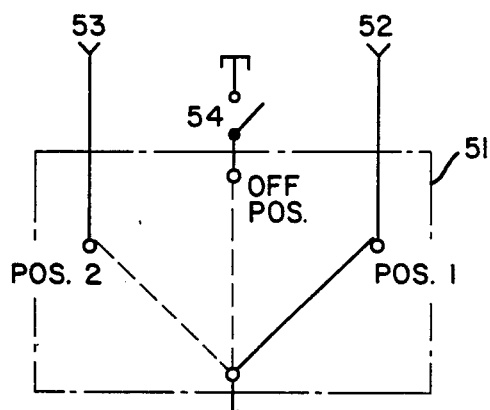
FIGS. 6, 7 and 8 are 1-line diagrams depicting the system of FIG. 5 except many functions are combined in a single transfer switch.

FIG. 6 is a single line diagram of the system of FIGS. 4 and 5 except both voltage source switching means and mechanical interlocking are combined in a single 3-position transfer switch 51. In position 1 only the normal voltage source 52 is connected. In position 2 only the alternate voltage source 53 is connected. The short-circuiting switch 54 is effective only in the off position. The control means and electrical interlocking means for this configuration are functionally equivalent to those described in FIGS. 4 and 5.

Figure 7:
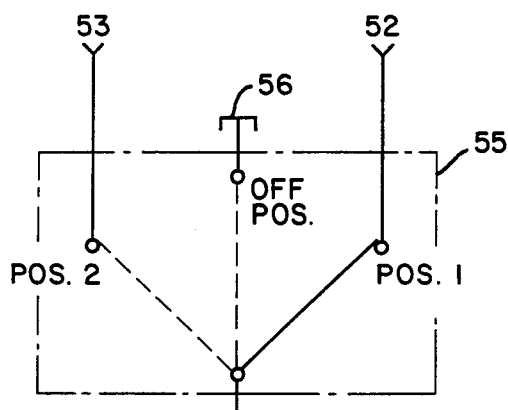

The configuration of FIG. 7 is the same as that of FIG. 6 except the short-circuiting switch is also combined in the 3-position transfer switch 55. In this case, the short circuit 56 of outgoing circuits is accomplished whenever the transfer switch is in the off position.

Figure 8:
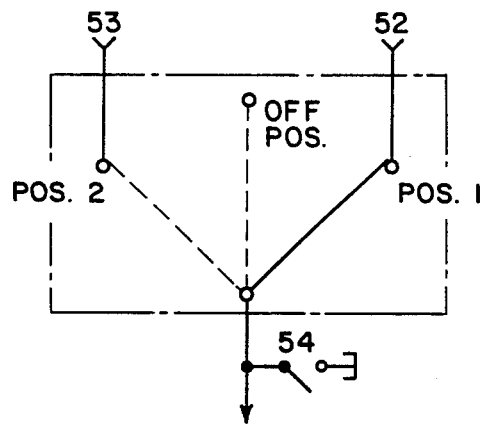

The transfer switch of FIG. 8 is functionally equivalent to that described in FIG. 6 except the short-circuiting switch 54 is connected directly to outgoing circuits.

Figure 9:
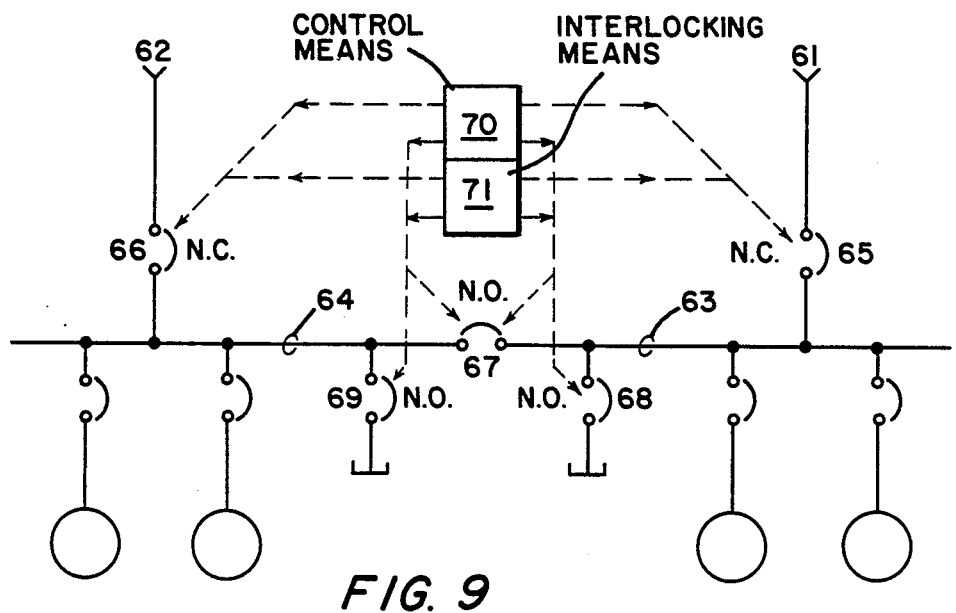
FIG. 9 is a 1-line diagram showing a secondary selective switching station with induction machines protected according to the present invention.

FIG. 9 shows, in single line form, a secondary-selective switching station utilizing electrically operated circuit breakers for source switching means, bus tie switching means and short-circuiting switches. This is a very common configuration used in industry and, as such, is an important application for the present invention. In this configuration, two voltage sources 61, 62 feed main bus bars 63, 64 through normally closed switching means 65, 66. The two bus bar sections 63, 64 respectively are coupled together through a normally open bus tie circuit breaker 67. Outgoing circuits supply power to one or more induction machine.

Said voltage sources 61, 62 normally supply power to their independent bus bar sections 63, 64 respectively and the loads connected thereto. If one such voltage source 61 is interrupted, said source switching means 65 is tripped and said bus tie circuit breaker 67 is closed to re-establish voltage at bus bar section 63 from the second voltage source 62.

In accordance with the present invention, a short-circuiting breaker 68, 69 is connected to each bus sections 63, 64, respectively, in order to short circuit said bus sections 63, 64, respectively and all circuits supplied therefrom when said short-circuiting circuit breaker 68, 69 is closed. A control means 70 functions to cause the following operations when said voltage source 61 is interrupted:
1. Close said short-circuiting circuit breaker 68;
2. Hold the short-circuiting circuit breaker closed for a predetermined period of time;
3. At the end of said time period, open said short-circuiting circuit breaker; and
4. Close said bus tie circuit breaker 67 when said short-circuiting circuit breaker is open, thus re-establishing voltage to bus bar section 63.

An interlocking means 71 functions as follows when said voltage source 61 is interrupted:
1. Prevent closing said short-circuiting circuit breaker unless said voltage source circuit breaker and said bus tie circuit breaker are both open.
2. Prevent closing said voltage source circuit breaker or said bus tie circuit breaker 67 unless said short-circuiting circuit breaker 67 is open.

Many additional control, interlocking and protective functions may be utilized in the secondary selective configuration depicted in FIG. 9. Those additional functions are not directly associated with the present invention and therefore are not disclosed herein.

Figure 10:
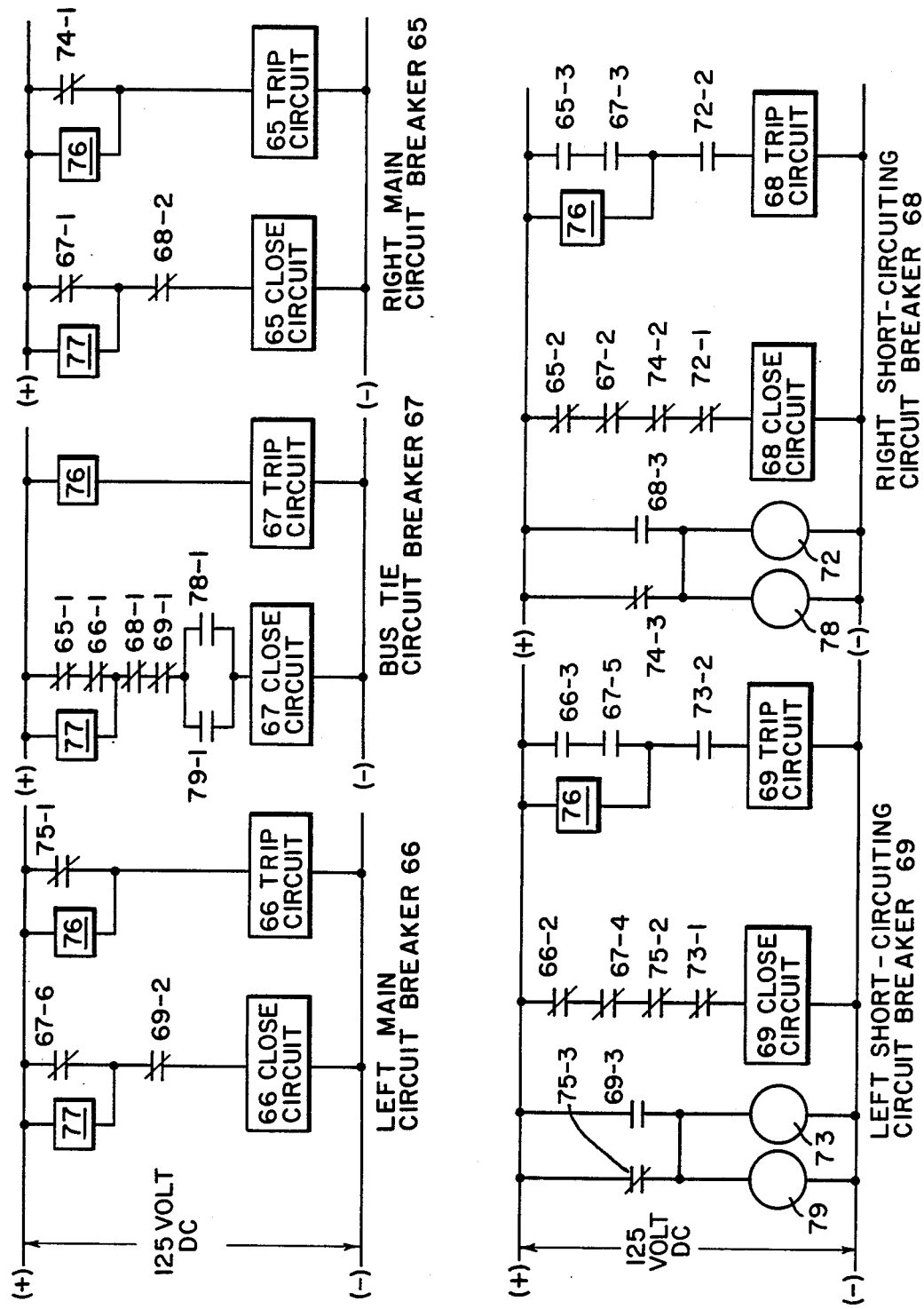
FIG. 10 shows a schematic diagram of control circuits for the system of FIG. 9, including examples of control and interlocking means.

The control and interlocking means for the system of FIG. 9 are shown in FIG. 10. FIG. 10 is a schematic diagram of the 125 volt dc control circuits for the right hand source 65, bus tie 67, left hand source 66, right hand short-circuiting 68, and left hand short-circuiting 69 circuit breakers.

Control means are provided by devices which assume the position shown when voltage is interrupted to the right hand bus 74-1, 74-2, 74-3 or the left hand bus 75-1, 75-2, 75-3; and by time delay relays 72, 78 for the right hand bus and 73, 79 for the left hand bus. Contacts of the first relay on each bus 72, 73 are time delayed after energization, and those for the second relay on each bus 78, 79 are time delayed after de-energization.

Electrical interlocking is provided by circuit breaker auxiliary contacts 65-1, 65-2, 65-3, 66-1, 66-2, 66-3, 67-1, 67-2, 67-3, 67-4, 67-5, 67-6, 68-1, 68-2, 68-3, 69-1, 69-2, 69-3.

In addition to said control and interlocking means, circuit breaker trip coils are normally actuated by protective relays and manually operated control switches 76. Likewise, close coils are normally actuated by manually operated control switches 77. The controls and interlocks shown in FIG. 10 include primarily those functions directly pertaining to the present invention. Additional protection, indication, control and interlocking means are normally provided to suit the specific requirements of a particular installation.

Figure 11:
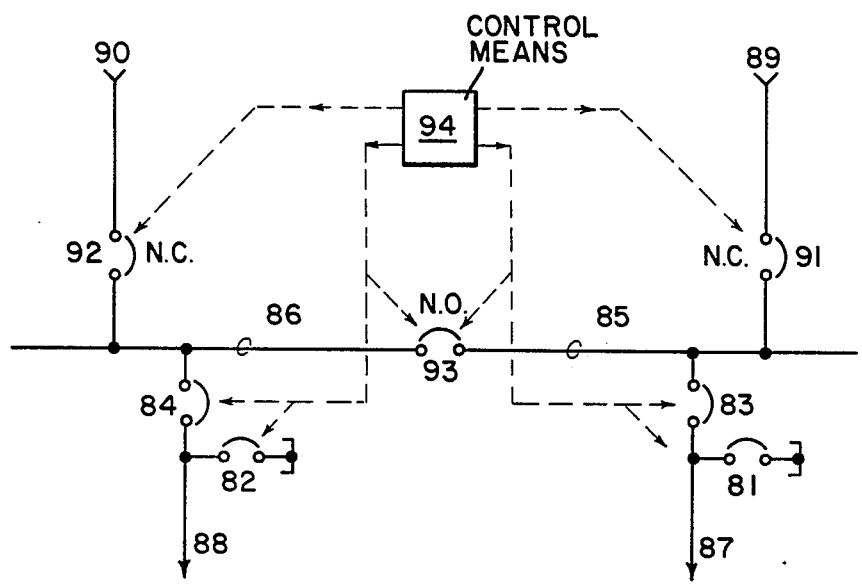
FIG. 11 is a 1-line diagram of the system of FIG. 9 except arranged to allow positive mechanical interlocking to prevent short circuiting of a source voltage.

To avoid any possibility of short circuiting a source, positive mechanical interlocking, between voltage source switching means and short-circuiting switch, is desireable. For many configurations, such as that described in FIG. 9, mechanical interlocking is difficult to accomplish because of the physical layout of the equipment. In such a case, the configuration depicted in the 1-line diagram of FIG. 11 may be utilized. Short-circuiting switches 81, 82 and local source switching means 83, 84 are inserted between the bus bars 85, 86 and the outgoing circuits 87, 88 feeding multiple induction machines. Said local source and short-circuiting switches are physically adjacent to one another so they can conveniently be mechanically interlocked. Thus, when the short-circuiting switch is closed, the path from the voltage source is open so that a source short circuit is impossible. The control means 94, following interruption of the main right-hand source 89, functions as follows:

1. Open main source switching means 91.
2. Open local source switching means 83 and close short-circuiting switch 81.
3. After a predetermined period of time, open short-circuiting switch 81 and close the local source switching means 83 and bus tie circuit breaker 93.

Figure 12:
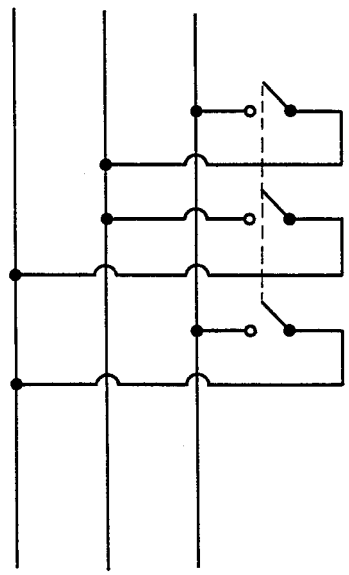
FIG. 12 shows a 3-pole short-circuiting switch for connecting the short circuit in delta.

While the short-circuiting switch of FIGS. 1, 2, 3 and 5 are shown as 2-pole switches with the short circuit made up as 3 conductors connected in wye, it may be more desirable in some cases to utilize 3-pole switches with one pole in each leg of a delta-connected short circuit. Such a configuration is shown in FIG. 12. Use of such a 3-pole switch will reduce the switch current-carrying and current-switching requirements.

A 3-pole switch will also be required if it is desired to connect the short circuit point to ground.

In some applications it may be desireable to place impedance elements in the short circuit path. This may be done to reduce the current requirements of the short-circuiting switch, but the residual voltage decay time may be extended somewhat in this manner.

I claim as my invention:

1. A system for protection of an induction machine, comprising:

a voltage source switching means for connection to a voltage source;

a short-circuiting switch for connection to induction machine supply conductors, between said voltage source switching means and the terminals of said induction machine, in such a manner that said supply conductors are short circuited when said short-circuiting switch is closed;

control means for closing said short-circuiting switch after said voltage source is interrupted, said short-circuiting switch being held closed for a predetermined period of time and, at the end of said predetermined period of time, said short-circuiting switch being opened, thereby enabling said voltage source to be re-established; and an interlocking system to prevent closing said voltage source switching means unless said short-circuiting switch is open and to prevent closing said short-circuiting switch unless said voltage source switching means is open.

2. A system for protection of an induction machine, comprising:

a voltage source switching means for connection to a voltage source;

a short-circuiting switch for connection to induction machine supply conductors, between said voltage source switching means and the terminals of said induction machine, in such a manner that said supply conductors are short circuited when said short-circuiting switch is closed;

control means for closing said short-circuiting switch after said voltage source is interrupted, said short-circuiting switch being held closed until the residual voltage of said induction machine has decayed to a predetermined value, after which said short-circuiting switch is opened, thereby enabling said voltage source to be re-established; and an interlocking system to prevent closing said voltage source switching means unless said short-circuiting switch is open and to prevent closing said short-circuiting switch unless said voltage source switching means is open.

3. A system for protection of induction machines, comprising:

a voltage source switching means for connection to a voltage source;

a short-circuiting switch for connection to conductors, between said voltage source switching means and the terminals of multiple induction machines, in such a manner that said conductors are short circuited when said short-circuiting switch is closed;

control means for closing said short-circuiting switch after said voltage source is interrupted, said short-circuiting switch being held closed for a predetermined period of time and, at the end of said predetermined period of time, said short-circuiting switch being opened, thereby enabling said voltage source to be re-established; and an interlocking system to prevent closing said voltage source switching means unless said short-circuiting switch is open and to prevent closing said short-circuiting switch unless said voltage source switching means is open.

4. A system for protection of induction machines, comprising:

a voltage source switching means for connection to a voltage source;

a short-circuiting switch for connection to conductors, between said voltage source switching means and the terminals of multiple induction machines, in such a manner that said conductors are short circuited when said short-circuiting switch is closed;

control means for closing said short-circuiting switch after said voltage source is interrupted, said short-circuiting switch being held closed until the residual voltage of said induction machines has decayed to a predetermined value, after which said short-circuiting switch is opened, thereby enabling said voltage source to be re-established; and an interlocking system to prevent closing said voltage source switching means unless said short-circuiting switch is open and to prevent closing said short-circuiting switch unless said voltage source switching means is open.

5. A system for protection of induction machines wherein said machines are supplied from a first voltage source or a second voltage source, said system comprising:

a first voltage source switching means for connection to said first voltage source, said first voltage source switching means being normally operated closed;

a second voltage source switching means for connection to said second voltage source, said second voltage source switching means being normally operated open;

a short-circuiting switch for connection to induction machine supply conductors, between said first and second voltage source switching means and the terminals of said induction machine, in such a manner that said supply conductors are short circuited when said short-circuiting switch is closed;

control means for closing said short-circuiting switch after said first voltage source is interrupted, said short-circuiting switch being held closed for a predetermined period of time and, at the end of said predetermined period of time, said short-circuiting switch being opened, thereby enabling said second voltage source to be established; and an interlocking system to prevent closing either of said first and second voltage source switching means unless said short-circuiting switch is open and to prevent closing said short-circuiting switch unless both of said first and second voltage source switching means are open.

6. A system as defined in claim 5, wherein said first and second voltage source switching means and said interlocking system comprise:

a three position selector switch having a first position whereby said induction machine supply connectors are connected to said first voltage source and said second voltage source and the connections to said short-circuiting switch are open, said three position selector switch having a second position whereby said induction machine supply connectors are connected to said second voltage source and said first voltage source and the connections to said short-circuiting switch are open, said three position selector switch having a third position whereby said induction machine supply connectors are connected to said short-circuiting switch and said first and said second voltage sources are open.

7. A system as defined in claim 5, wherein said first and second voltage source switching means, said short-circuiting switch, and said interlocking system together comprise:

a three position selector switch having a first position whereby said induction machine supply connectors are connected to said first voltage source and said second voltage source and said short circuit are open, said three position selector switch having a second position whereby said induction machine supply connectors are connected to said second voltage source and said first voltage source and said short circuit are open, said three position selector switch having a third position whereby said induction machine supply connectors are short circuited and said first and said second voltage sources are open.

8. A system for protection of induction machines wherein said machines are supplied from a first voltage source or a second voltage source, said system comprising:

a first voltage source switching means for connection to said first voltage source, said first voltage source switching means being normally operated closed;

a second voltage source switching means for connection to said second voltage source, said second voltage source switching means being normally operated open;

a short-circuiting switch for connection to induction motor supply conductors, between said first and second voltage source switching means and the terminals of said induction machine, in such a manner that said supply conductors are short circuited when said short-circuiting switch is closed;

control means for closing said short-circuiting switch after said first voltage source is interrupted, said short-circuiting switch being held closed until the residual voltage of said induction machine has decayed to a predetermined value, after which said short-circuiting switch is opened, thereby enabling said second voltage source to be established; and an interlocking system to prevent closing either of said first and second voltage source switching means unless said short-circuiting switch is open and to prevent closing said short-circuiting switch unless both of said first and second voltage source switching means are open.

9. A system as defined in claim 8, wherein said first and second voltage source switching means and said interlocking system comprise:

a three position selector switch having a first position whereby said induction machine supply connectors are connected to said first voltage source and said second voltage source and the connections to said short-circuiting switch are open, said three position selector switch having a second position whereby said induction machine supply connectors are connected to said second voltage source and said first voltage source and the connections to said short-circuiting switch are open, said three position selector switch having a third position whereby said induction machine supply connectors are connected to said short-circuiting switch and said first and said second voltage sources are open.

10. A system as defined in claim 8, wherein said first and second voltage source switching means, said short-circuiting switch, and said interlocking system together comprise:

a three position selector switch having a first position whereby said induction machine supply connectors are connected to said first voltage source and said second voltage source and said short circuit are open, said three position selector switch having a second position whereby said induction machine supply connectors are connected to said second voltage source and said first voltage source and said short circuit are open, said three position selector switch having a third position whereby said induction machine supply connectors are short circuited and said first and said second voltage sources are open.

11. A system for protection of induction machines wherein said machines are supplied from a first voltage source or a second voltage source, said system comprising:
- a first voltage source switching means for connection to said first voltage source, said first voltage source switching means being normally operated closed;
- a second voltage source switching means for connection to said second voltage source, said second voltage source switching means being normally operated open;
- a short-circuiting switch for connection to conductors, between said first and second voltage source switching means and the terminals of multiple induction machines, in such a manner that said conductors are short circuited when said short-circuiting switch is closed;
- control means for closing said short-circuiting switch after said first voltage source is interrupted, said short-circuiting switch being held closed for a predetermined period of time and, at the end of said predetermined period of time, said short-circuiting switch being opened, thereby enabling said second voltage source to be established; and
- an interlocking system to prevent closing either of said first and second voltage source switching means unless said short-circuiting switch is open and to prevent closing said short-circuiting switch unless both of said first and second voltage source switching means are open.

12. A system as defined in claim 11, wherein said first and second voltage source switching means and said interlocking system comprise:
- a three position selector switch having a first position whereby said induction machine supply connectors are connected to said first voltage source and said second voltage source and the connections to said short-circuiting switch are open, said three position selector switch having a second position whereby said induction machine supply connectors are connected to said second voltage source and said first voltage source and the connections to said short-circuiting switch are open, said three position selector switch having a third position whereby said induction machine supply connectors are connected to said short-circuiting switch and said first and said second voltage sources are open.

13. A system as defined in claim 11, wherein said first and second voltage source switching means, said short-circuiting switch, and said interlocking system together comprise:
- a three position selector switch having a first position whereby said induction machine connectors are connected to said first voltage source and said second voltage source and said short circuit are open, said three position selector switch having a second position whereby said induction machine supply connectors are connected to said second voltage source and said first voltage source and said short circuit are open, said three position selector switch having a third position whereby said induction machine supply connectors are short circuited and said first and said second voltage sources are open.

14. A system for protection of induction machines wherein said machines are supplied from a first voltage source or a second voltage source, said system comprising:
- a first voltage source switching means for connection to said first voltage source, said first voltage source switching means being normally operated closed;
- a second voltage source switching means for connection to said second voltage source, said second voltage source switching means being normally operated open;
- a short-circuiting switch for connection to conductors, between said first and second voltage source switching means and the terminals of multiple induction machines, in such a manner that said conductors are short circuited when said short-circuiting switch is closed;
- control means for closing said short-circuiting switch after said first voltage source is interrupted, said short-circuiting switch being held closed until the residual voltage of said induction machines has decayed to a predetermined value, after which said short-circuiting switch is opened, thereby enabling said second voltage source to be established; and
- an interlocking system to prevent closing either of said first and second voltage source switching means unless said short-circuiting switch is open and to prevent closing said short-circuiting switch unless both of said first and second voltage source switching means are open.

15. A system as defined in claim 14, wherein said first and second voltage source switching means and said interlocking system comprise:
- a three position selector switch having a first position whereby said induction machine supply connectors are connected to said first voltage source and said second voltage source and the connections to said short-circuiting switch are open, said three position selector switch having a second position whereby said induction machine supply connectors are connected to said second voltage source and said first voltage source and the connections to said short-circuiting switch are open, said three position selector switch having a third position whereby said induction machine supply connectors are connected to said short-circuiting switch and said first and said second voltage sources are open.

16. A system as defined in claim 14, wherein said first and second voltage source switching means, said short-circuiting switch, and said interlocking system together comprise:
- a three position selector switch having a first position whereby said induction machine supply connectors are connected to said first voltage source and said second voltage source and said short circuit are open, said three position selector switch having a second position whereby said induction machine supply connectors are connected to said second voltage source and said first voltage source and said short circuit are open, said three position selector switch having a third position whereby said induction machine supply connectors are short circuited and said first and said second voltage sources are open.

17. A system for protection of an induction machine which is supplied with power through supply conductors between the terminals of said induction machine and a voltage source switch which is connected to a voltage source, said system comprising:
- a short-circuiting switch for connection to said supply conductors, said supply conductors being short circuited when said short-circuiting switch is closed;

control means for opening said voltage source switch and closing said short-circuiting switch after said voltage source is interrupted, said short-circuiting switch being held closed for a predetermined period of time and, at the end of said predetermined period of time, said short-circuiting switch being opened, thereby enabling said voltage source to be re-established; and an interlocking system to prevent closing said voltage source switch unless said short-circuiting switch is open and to prevent closing said short-circuiting switch unless said voltage source switch is open.

18. A system for protection of an induction machine which is supplied with power through supply conductors between the terminals of said induction machine and a voltage source switch which is connected to a voltage source, said system comprising:

a short-circuiting switch for connection to said supply conductors, said supply conductors being short circuited when said short-circuiting switch is closed;

control means for opening said voltage source switch and closing said short-circuiting switch after said voltage source is interrupted, said short-circuiting switch being held closed until the residual voltage of said induction machine has decayed to a predetermined value, after which said short-circuiting switch is opened, thereby enabling said voltage source to be re-established; and an interlocking system to prevent closing said voltage source switch unless said short-circuiting switch is open and to prevent closing said short-circuiting switch unless said voltage source switch is open.

* * * * *